(12) United States Patent
Shepherd et al.

(10) Patent No.: US 12,326,968 B1
(45) Date of Patent: Jun. 10, 2025

(54) ORIENTING DIGITAL HUMANS TOWARDS ISOLATED SPEAKER

(71) Applicant: Dell Products L.P., Round Rock, TX (US)

(72) Inventors: Michael David Shepherd, Leander, TX (US); Jonathan M. Whitson, Mountain Grove, MO (US); Joseph Michael Whitson, Mansfield, MO (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/652,943

(22) Filed: May 2, 2024

(51) Int. Cl.
*G06F 3/01* (2006.01)
*G06F 16/783* (2019.01)
*G06V 10/25* (2022.01)

(52) U.S. Cl.
CPC .......... *G06F 3/011* (2013.01); *G06F 16/7844* (2019.01); *G06V 10/25* (2022.01)

(58) Field of Classification Search
CPC ...... G06F 3/011; G06F 16/7844; G06V 10/25
See application file for complete search history.

(56) References Cited

U.S. PATENT DOCUMENTS 10,242,501 B1 * 3/2019 Pusch .............. H04N 21/44218
12,206,991 B2 * 1/2025 Jordan ................... G06V 40/28
2021/0044913 A1 * 2/2021 Häussler ............... G06T 13/205
2021/0377653 A1 * 12/2021 Grinnip, III ........... H04R 1/326
2022/0191638 A1 * 6/2022 Stengel ................. G06V 40/10
2024/0311075 A1 * 9/2024 Balsam .................. G06F 3/165
2024/0340605 A1 * 10/2024 Kimura ..................... H04S 7/40

OTHER PUBLICATIONS https://rasa.com/solutions/bots-digital-assistants/; downloaded Apr. 30, 2024.
"Digital Humans"; https://www.reddit.com/r/vfx/comments/zxc57o/digital_humans/; downloaded Apr. 30, 2024.
Kim, Myeongseop; "Optimizing Digital Human Movement; Waist-Centric Rotation and 3D Pose Estimation"; https://www.researchgate.net/publication/375635947_Optimizing_Digital_Human_Movement_Waist-Centric_Rotation_and_3D_Pose_Estimation; Conference Paper; Oct. 2023.

* cited by examiner

*Primary Examiner* — Jonathan A Boyd
(74) *Attorney, Agent, or Firm* — Ryan, Mason & Lewis, LLP

(57) ABSTRACT

Techniques are provided for orienting a digital human towards an isolated human speaker. One method comprises obtaining coordinates associated with a human speaker; storing the coordinates as a variable in a memory of a multi-dimensional graphics engine; instantiating a multi-dimensional plane within the multi-dimensional graphics engine; positioning a multi-dimensional shape in the multi-dimensional plane based on the stored coordinates; and binding a digital human to the multi-dimensional shape to orient the digital human towards a position of the multi-dimensional shape. The coordinates may be obtained by comparing text obtained from one or more video streams to text obtained from one or more audio signals.

20 Claims, 11 Drawing Sheets

1. TRANSFORM AUDIO SIGNALS FROM A MULTI-DIRECTIONAL MICROPHONE ARRAY TO FIRST SETS OF PREDICTED SPOKEN WORDS USING AT LEAST ONE SPEECH-TO-TEXT CONVERSION MODEL;

2. TRANSFORM FACIAL IMAGES FROM VIDEO STREAM TO SECOND SETS OF PREDICTED SPOKEN WORDS USING AT LEAST ONE LIP MOTION-TO-TEXT CONVERSION MODEL, WHEREIN THE SECOND SETS OF PREDICTED SPOKEN WORDS ARE BASED AT LEAST IN PART ON AN ANALYSIS OF A RESPECTIVE BOUNDING BOX (OR ANOTHER CROPPED IMAGE) ASSOCIATED WITH AT LEAST THE LIPS OF A RESPECTIVE SPEAKER;

3. ITERATIVELY ADJUST A STEERING VECTOR ASSOCIATED WITH THE MULTI-DIRECTIONAL MICROPHONE ARRAY TO COMPARE AT LEAST ONE OF THE FIRST SETS OF PREDICTED SPOKEN WORDS WITH AT LEAST ONE OF THE SECOND SET OF PREDICTED SPOKEN WORDS;

4. SELECT AN ISOLATED SPEAKER AUDIO SIGNAL ASSOCIATED WITH A PARTICULAR ONE OF THE FIRST SETS OF PREDICTED SPOKEN WORDS AND A PARTICULAR ONE OF THE SECOND SET OF PREDICTED SPOKEN WORDS, WHEREIN THE SELECTION IS BASED AT LEAST IN PART ON A RESULT OF THE COMPARISON; AND

5. VALIDATE ISOLATED SPEAKER AUDIO SIGNAL OVER TIME BY EVALUATING ONE OR MORE PREDICTED NEXT WORDS OF THE ISOLATED SPEAKER AUDIO SIGNAL WITH A CORRESPONDING SET OF PREDICTED SPOKEN WORDS FROM THE AT LEAST ONE SPEECH-TO-TEXT CONVERSION MODEL.

FIG. 5

1. OBTAIN COORDINATES OF BOUNDING BOX (OR ANOTHER CROPPED IMAGE) ASSOCIATED WITH ISOLATED SPEAKER AUDIO SIGNAL;

2. STORE BOUNDING BOX COORDINATES AS A VARIABLE IN A MEMORY OF A THREE-DIMENSIONAL GRAPHICS ENGINE;

3. INSTANTIATE TWO-DIMENSIONAL PLANE WITHIN THE THREE-DIMENSIONAL GRAPHICS ENGINE;

4. POSITION A THREE-DIMENSIONAL SHAPE IN THE INSTANTIATED TWO-DIMENSIONAL PLANE BASED AT LEAST IN PART ON THE STORED BOUNDING BOX COORDINATES;

5. BIND DIGITAL HUMAN TO THREE-DIMENSIONAL SHAPE TO ORIENT DIGITAL HUMAN TOWARDS POSITION OF THREE-DIMENSIONAL SHAPE AND TO DIRECT EYE FOCUS OF DIGITAL HUMAN TO POSITION OF THREE-DIMENSIONAL SHAPE;

6. ADJUST BODY AND/OR HANDS OF DIGITAL HUMAN TOWARDS POSITION OF BODY AND/OR HANDS OF SPEAKER BASED ON POSITION OF THREE-DIMENSIONAL SHAPE; AND

7. REPEAT STEPS 1 THROUGH 6 FOR ONE OR MORE ADDITIONAL ITERATIONS.

FIG. 7

ORIENTING DIGITAL HUMANS TOWARDS ISOLATED SPEAKER

BACKGROUND

A digital human is a computer-generated representation of a person that aims to behave like a real person. Users increasingly engage with digital humans in various environments, such as retail environments, training environments and customer support environments, and for various purposes. There are a number of challenges, however, that need to be addressed in order for such digital humans to successfully interact like a real person.

SUMMARY

Illustrative embodiments of the disclosure provide techniques for orienting a digital human towards an isolated human speaker. One method includes obtaining one or more coordinates associated with at least one human speaker; storing the one or more coordinates as at least one variable in a memory of a multi-dimensional graphics engine; instantiating a multi-dimensional plane within the multi-dimensional graphics engine; positioning a multi-dimensional shape in the multi-dimensional plane based at least in part on the stored one or more coordinates; and binding a processor-based digital human to the multi-dimensional shape to orient the processor-based digital human towards a position of the multi-dimensional shape.

Illustrative embodiments can provide significant advantages relative to conventional techniques. For example, technical problems related to such conventional techniques are mitigated in one or more embodiments by binding a processor-based digital human to a multi-dimensional shape, based on a position of a bounding box or another cropped image associated with a human speaker, to orient the processor-based digital human towards a position of the multi-dimensional shape.

These and other illustrative embodiments described herein include, without limitation, methods, apparatus, systems, and computer program products comprising processor-readable storage media.

BRIEF DESCRIPTION OF THE DRAWINGS

FIG. 5 is a flow diagram illustrating an exemplary implementation of a process for identifying an isolated speaker signal in accordance with an illustrative embodiment;

FIG. 7 is a flow diagram illustrating an exemplary implementation of a process for orienting a digital human towards a speaker associated with an isolated speaker signal in accordance with an illustrative embodiment;

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for orienting a digital human towards an isolated human speaker.

In one or more embodiments, techniques are provided for orienting a digital human towards an isolated speaker. Sensing data (such as audio and/or video sensor data) related to one or more remote users can be applied to the disclosed digital human adaptation system (comprising, for example, one or more analytics algorithms, such as machine learning (ML) algorithms, artificial intelligence (AI) techniques, computer vision (CV) algorithms and/or data analytics algorithms) to obtain real-time responses for each remote user.

In at least some embodiments, the disclosed digital human adaptation techniques provide a number of technical solutions. For example, an isolated speaker audio signal associated with a given speaker of interest may be selected from multiple audio signals by comparing text obtained from one or more video streams to text obtained from the multiple audio signals.

In one or more embodiments, the disclosed techniques for orienting a digital human towards (e.g., in the direction of) an isolated speaker employ computer vision and audio processing techniques to collect and evaluate real-time user behavior information, such as lip movement. The collected data can be processed to automatically orient a processor-based digital human towards an isolated speaker.

At least some aspects of the disclosure recognize that users may be less engaged with a digital human than with a real person because physical interactions with the digital human may be reduced or non-existent, which may decrease the rich communication and other dynamics that encourage users to consistently participate in a dialogue. In an in-person physical environment, for example, participants can more easily identify visual cues of a user by evaluating the body language and/or facial expression of participants to obtain an immediate assessment of each participant's interests. In a remote digital human environment, however, it is difficult for participants to evaluate and assess the interests of other participants remotely.

Figure 1:
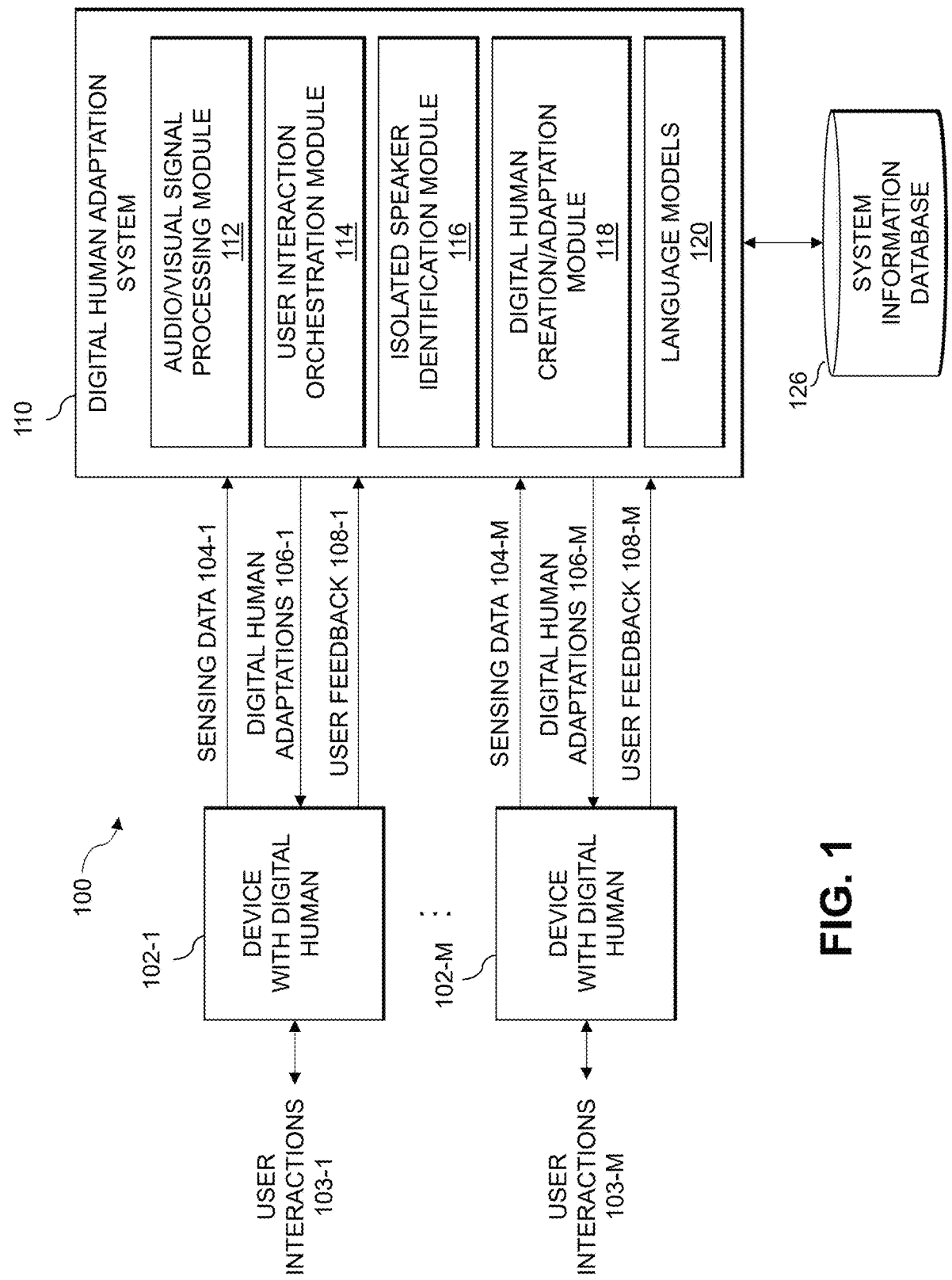
FIG. 1 illustrates an information processing system configured for orienting a digital human towards an isolated human speaker in accordance with an illustrative embodiment.

FIG. 1 shows an information processing system 100 configured in accordance with an illustrative embodiment. The information processing system 100 comprises a plurality of devices with a digital human 102-1 through 102-M, collectively referred to herein as digital human devices 102. The digital human devices 102-1 through 102-M interact with one or more respective users to generate respective user interactions 103-1 through 103-M. Generally, artificial intelligence-based chat robots (e.g., chatbots) or other digital humans typically use one or more machine learning models to understand a context and an intent of a question asked by a user before providing an answer. The digital human devices 102 may be implemented, for example, as a user device presenting a digital human, a kiosk presenting a digital human, and/or a device that presents a digital human using a holograph and/or a three-dimensional or lenticular display. The information processing system 100 further comprises one or more digital human adaptation systems 110 and a system information database 126, discussed below.

The digital human devices 102 may comprise, for example, host devices and/or devices such as mobile telephones, laptop computers, tablet computers, desktop computers, kiosks, holographic devices, three-dimensional displays or other types of computing devices (e.g., virtual reality (VR) devices or augmented reality (AR) devices). Such devices are examples of what are more generally referred to herein as "processing devices." Some of these processing devices are also generally referred to herein as "computers." The digital human devices 102 may comprise a network client that includes networking capabilities such as ethernet, Wi-Fi, etc. The digital human devices 102 may be implemented, for example, by participants of a customer support interaction, such as one or more users or customers and one or more virtual customer support representatives.

One or more of the digital human devices 102 and the digital human adaptation system 110 may be coupled to a network, where the network in this embodiment is assumed to represent a sub-network or other related portion of a larger computer network. The network is assumed to comprise a portion of a global computer network such as the Internet, although other types of networks can be part of the computer network, including a wide area network (WAN), a local area network (LAN), a satellite network, a telephone or cable network, a cellular network, a wireless network such as a Wi-Fi or WiMAX network, or various portions or combinations of these and other types of networks. The network in some embodiments therefore comprises combinations of multiple different types of networks, each comprising processing devices configured to communicate using internet protocol (IP) or other related communication protocols.

The digital human devices 102 and/or the digital human adaptation system 110 in some embodiments comprise respective devices and/or servers associated with a particular company, organization or other enterprise. In addition, at least portions of the information processing system 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, such as avatar or other computer-generated representations of a human, as well as various combinations of such entities. Compute and/or storage services may be provided for users under a Platform-as-a-Service (PaaS) model, an Infrastructure-as-a-Service (IaaS) model, a Storage-as-a-Service (STaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of edge devices, or a stand-alone computing and storage system implemented within a given enterprise.

One or more of the digital human devices 102 and the digital human adaptation system 110 illustratively comprise processing devices of one or more processing platforms. For example, the digital human adaptation system 110 can comprise one or more processing devices each having a processor and a memory, possibly implementing virtual machines and/or containers, although numerous other configurations are possible. The processor illustratively comprises a microprocessor, a microcontroller, an application-specific integrated circuit (ASIC), a field-programmable gate array (FPGA) or other type of processing circuitry, as well as portions or combinations of such circuitry elements.

One or more of the digital human devices 102 and the digital human adaptation system 110 can additionally or alternatively be part of cloud infrastructure or another cloud-based system.

In the example of FIG. 1, each digital human device 102-1 through 102-M provides corresponding sensing data 104-1 through 104-M, collectively referred to herein as sensing data 104, associated with the respective user to the digital human adaptation system 110. For example, the sensing data 104 may be generated by cameras, microphones, IoT sensors or other sensors near the respective users that can be used for data collection, including audio signals, video signals, physiological data, motion and emotion data. The sensors may be embedded within existing digital human devices 102, such as graspable and touchable user devices (e.g., computer, monitor, mouse, keyboards, smart phone and/or AR/VR headsets). The sensors may also be implemented as part of laptop computer devices, smart mobile devices or wearable devices on the body of a user, such as cameras, microphones, physiological sensors and smart watches.

In addition, each digital human device 102-1 through 102-M can receive digital human adaptations 106-1 through 106-M, collectively referred to herein as digital human adaptations 106, from the digital human adaptation system 110. The digital human adaptations 106 can be initiated, for example, to present and/or adjust a digital human on the respective digital human device 102, or to provide specific information to a respective user (e.g., requested information and/or topic summaries) and/or to stimulate the respective user if the respective user is detected to have a different sentiment or level of engagement than expected.

Further, each digital human device 102 can provide user feedback 108-1 through 108-M, collectively referred to herein as user feedback 108, to the digital human adaptation system 110 indicating, for example, an accuracy of information provided by the digital human on the digital human device 102 to a respective user (e.g., to fine tune an analytics engine or another model associated with the digital human adaptation system 110), special circumstances associated with the respective user and/or feedback regarding particular recommendations or suggestions made by the digital human adaptation system 110 in the form of digital human adaptations 106.

In some embodiments, users can receive or request information from the digital human on the digital human device 102, and provide the user feedback 108 back to the digital human adaptation system 110 indicating whether the digital human response or recommendations are accurate, thereby providing a closed loop learning system. The user feedback 108 indicating the accuracy of the digital human response or recommendations can be used to train and/or retrain one or more models employed by the digital human adaptation system 110.

In some embodiments, each digital human device 102 can receive additional feedback from the digital human adaptation system 110 based at least in part on the user interactions 103 of the respective user with the digital human. For example, the digital human adaptations 106 for a given user may comprise a text signal (e.g., to be transformed into a voice signal by the digital human), a voice message, graphical information and/or manipulations of the position, emotion and/or rotation of the digital human, or a combination of the foregoing, to provide targeted information, an alert and/or instructions to the given user during a digital human session.

The digital human adaptations 106 can be automatically generated, for example, if users are detected to have a negative sentiment or to be distracted (e.g., when the measured engagement level falls below a threshold or deviates from another criteria). For example, a voice message can ask if a user needs assistance during a digital human session, when the user fails to speak within a designated time period, or when the user is stressed or uninterested, for example. The digital human adaptations 106 could be specifically designed based on different scenarios.

As shown in FIG. 1, the exemplary digital human adaptation system 110 comprises an audio/visual signal processing module 112, a user interaction orchestration module 114, an isolated speaker identification module 116, a digital human creation/adaptation module 118 and at least one language model 120, as discussed further below.

In one or more embodiments, the audio/visual signal processing module 112 may be used to collect and/or process audio/visual data and other sensing data 104 and to optionally perform one or more (i) sensor data pre-processing tasks, (ii) audio/visual analysis tasks and/or (iii) audio/visual tracking tasks, for example. The user interaction orchestration module 114 coordinates the user interactions 103 between the digital human devices 102 and the respective users with one or more backend portions of the digital human adaptation system 110, for example. The exemplary isolated speaker identification module 116 evaluates audio/visual data and/or other sensor data to select an isolated speaker signal by comparing text obtained from audio and video streams, as discussed further below in conjunction with FIGS. 3 through 5, for example. One or more user query-based prompts may be applied to the at least one language model 120, such as a large language model or another model that can generate text and perform natural language processing (NLP) tasks, that determines a response to a user of a respective digital human device 102, as discussed herein. The at least one language model 120 may learn statistical relationships from a training dataset comprised of text documents using a self-supervised training process and/or a semi-supervised training process. The at least one language model 120, in some embodiments, may combine a partial response based on results from a user query and/or a partial response of the at least one language model 120 based on its own information into a final response.

The term "language model" as used herein is intended to be broadly construed so as to encompass, for example, natural language processing models trained on textual data to understand, generate, predict and/or summarize new content. The at least one language model 120 may be implemented, for example, using transformer-based architectures that process input through a sequence of transformers, where each transformer includes a self-attention layer and feedforward layer. Generally, a self-attention layer computes an importance of each token in a sequence of input tokens, and a feedforward layer transforms the output of the self-attention layer into a form that is suitable for the next transformer in the sequence.

The digital human creation/adaptation module 118 generates a given digital human presented on a respective digital human device 102 and/or one or more digital human adaptations 106 to one or more of the digital human devices 102, as discussed further below. The digital human creation/adaptation module 118 may orient a digital human towards an isolated speaker identified by the isolated speaker identification module 116. The digital human creation/adaptation module 118 may be implemented, at least in part, using an Unreal Engine three-dimensional computer graphics tool, commercially available from Epic Games, Inc., as modified herein to provide the features and functions of the present disclosure.

It is to be appreciated that this particular arrangement of elements 112, 114, 116, 118, 120 illustrated in the digital human adaptation system 110 of the FIG. 1 embodiment is presented by way of example only, and alternative arrangements can be used in other embodiments. For example, the functionality associated with elements 112, 114, 116, 118, 120 in other embodiments can be combined into a single elements, or separated across a larger number of elements. As another example, multiple distinct processors and/or memory elements can be used to implement different ones of elements 112, 114, 116, 118, 120 or portions thereof. At least portions of elements 112, 114, 116, 118, 120 may be implemented at least in part in the form of software that is stored in memory and executed by a processor.

The digital human adaptation system 110 may further include one or more additional modules and other components typically found in conventional implementations of such devices, although such additional modules and other components are omitted from the figure for clarity and simplicity of illustration.

In the FIG. 1 embodiment, the digital human adaptation system 110 is assumed to be implemented using at least one processing platform, with each such processing platform comprising one or more processing devices, and each such processing device comprising a processor coupled to a memory. Such processing devices can illustratively include particular arrangements of compute, storage and network resources.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different instances or portions of the digital human adaptation system 110 to reside in different data centers. Numerous other distributed implementations of the components of the system 100 are possible.

As noted above, the digital human adaptation system 110 can have an associated system information database 126 configured to store information related to one or more of the digital human devices 102, such as sensing, AR and/or VR capabilities, user preference information, static digital human topologies and a digital human datastore. Although the system information is stored in the example of FIG. 1 in a single system information database 126, in other embodiments, an additional or alternative instance of the system information database 126, or portions thereof, may be incorporated into the digital human adaptation system 110 or other portions of the system 100.

The system information database 126 in the present embodiment is implemented using one or more storage systems. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with one or more of the digital human devices 102 and the digital human adaptation system 110 can be one or more input/output devices (not shown), which illustratively comprise keyboards, displays or other types of input/output devices in any combination. Such input/output devices can be used, for example, to support one or more user interfaces to a digital human device 102, as well as to support communication between the digital human adaptation system 110 and/or other related systems and devices not explicitly shown in FIG. 1.

The memory of one or more processing platforms illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

It is to be understood that the particular set of elements shown in FIG. 1 for digital human adaptation is presented by way of illustrative example only, and in other embodiments additional or alternative elements may be used. Thus, another embodiment includes additional or alternative systems, devices and other network entities, as well as different arrangements of modules and other components.

One or more aspects of the disclosure recognize that existing digital humans lack an ability to predict questions of a user simply through observation. While humans can notice where a person is looking and ask them a question about the item they are looking at, a digital human needs an awareness of where the person is looking and what aspects of a display screen, for example, are being looked at.

Figure 2:
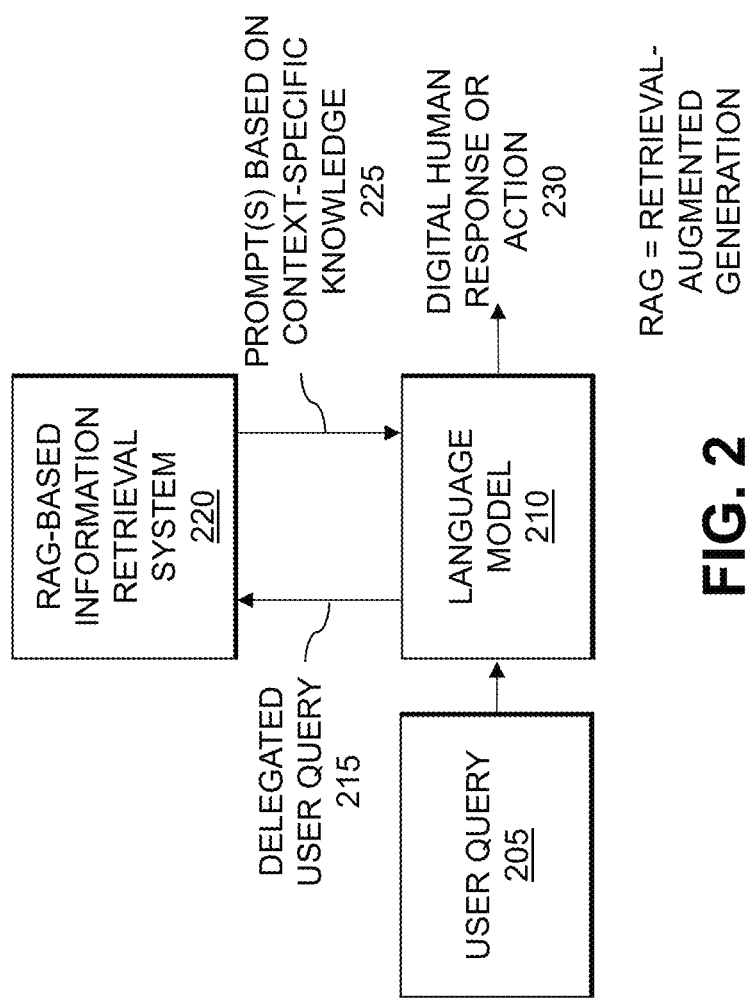
FIG. 2 illustrates a generation of a response for a digital human based at least in part on a user query-based prompt applied to a language model in accordance with an illustrative embodiment.

FIG. 2 illustrates a generation of a response for a digital human based at least in part on a user query-based prompt applied to a language model in accordance with an illustrative embodiment. In the example of FIG. 2, a user query 205 is applied to a language model 210. The user query 205 may be an explicit question asked by a user (e.g., as part of a conversational dialogue) and/or an implied question inferred from behavior of the user, such as a predicted region of interest to the user based at least in part on what the user is looking at (e.g., which may suggest what a person is thinking about and may be used to initiate and/or continue a dialogue with the user). In this manner, one or more embodiments of the present disclosure provide for intelligent prompt injection to the language model 210 using a retrieval-augmented generation (RAG)-based information retrieval system 220 to benefit the conversational flow.

The language model 210 (or another backend element of the digital human adaptation system 110) may delegate the user query 205, in some embodiments, as a delegated user query 215 to the RAG-based information retrieval system 220. The RAG-based information retrieval system 220 receives the delegated user query 215 as an input and performs one or more information retrieval operations. The response from the RAG-based information retrieval system 220 may be in the form of ranked results in some embodiments, and the top N results (e.g., the highest-ranking result) may be applied to the language model 210 as one or more prompts (e.g., based at least in part on a prompt size limit).

The RAG-based information retrieval system 220 generates one or more prompts 225 based on context-specific knowledge obtained using the delegated user query 215. RAG is a technique for enhancing the accuracy and/or reliability of generative artificial intelligence models, such as the language model 210, with information obtained from external sources. The prompts 225 ground the language model 210 in some embodiments using one or more external sources of knowledge that supplement the internal representation of information by the language model 210. The RAG-based information retrieval system 220 may be implemented, at least in part, in some embodiments, using the Pryon answer engine, commercially available from Pryon Inc. and/or the information retrieval functionality of the Milvus open-source vector database system.

The one or more prompts 225 are applied to the language model 210 that generates a digital human response or action 230 (e.g., relevant information and responses based on a conversational dialogue and/or the user's region of interest). The language model 210 may combine the retrieved words in the one or more prompts 225 with its own response to the user query 205 into a final digital human response or action 230. The digital human response or action 230 may be communicated to the user, for example, using the digital human creation/adaptation module 118, as discussed herein. The digital human response or action 230 may comprise relevant information and responses based on a conversational dialogue and/or what the user was looking at.

Figure 3:
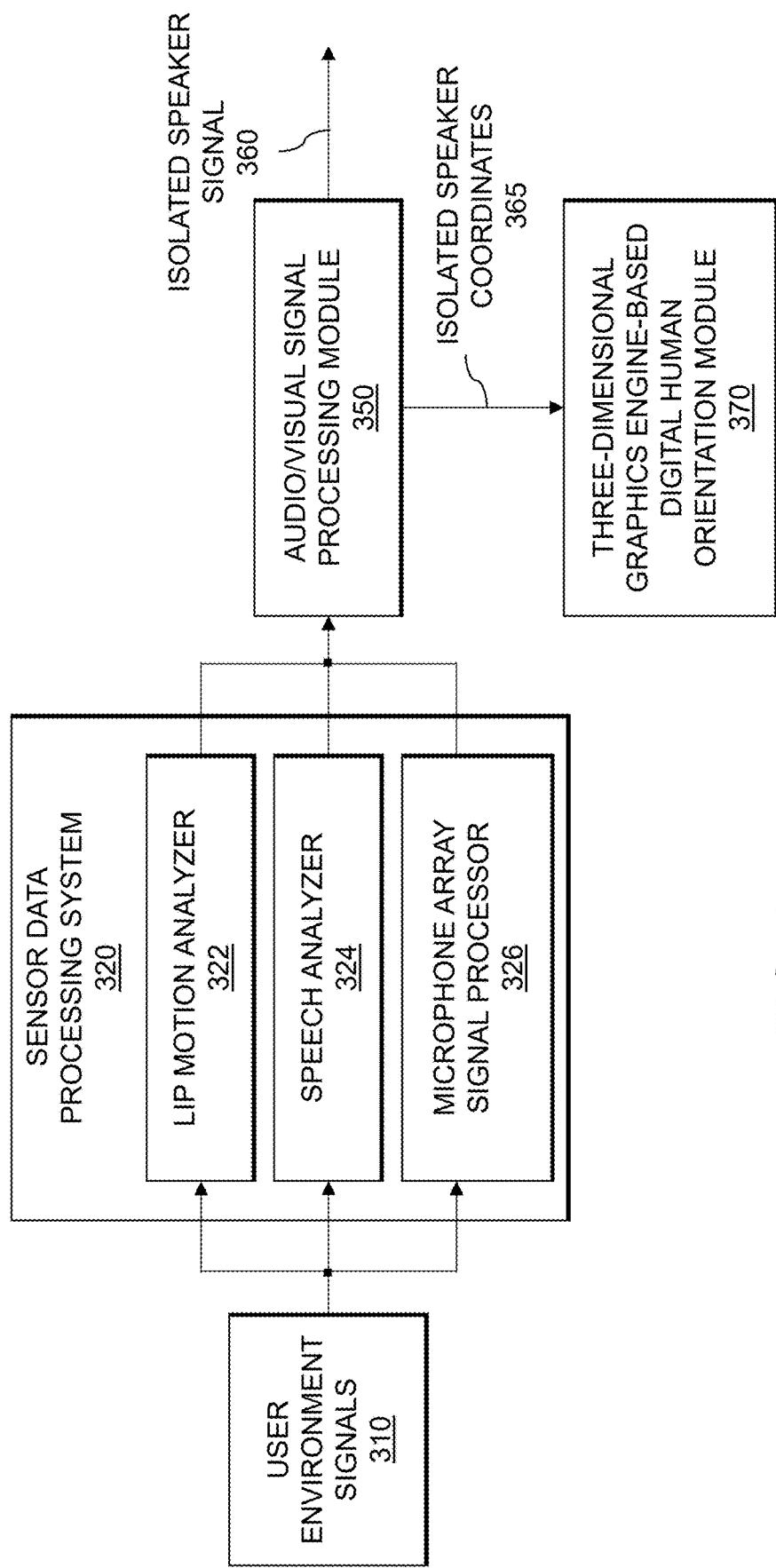
FIG. 3 illustrates an exemplary processing of sensor data from a user environment to identify an isolated speaker signal and to orient a digital human towards a speaker associated with the isolated speaker signal in accordance with an illustrative embodiment.

For additional discussions of digital human adaptation techniques, see, for example, U.S. patent application Ser. No. 18/652,936, entitled "Gesture-Based Processing of Digital Human Responses," U.S. patent application Ser. No. 18/652,961, entitled "Selecting Isolated Speaker Signal by Comparing Text Obtained from Audio and Video Streams," U.S. patent application Ser. No. 18/652,977, entitled "Phoneme-Based Pronunciations for Digital Humans," U.S. patent application Ser. No. 18/653,017, entitled "Sentiment-Based Adaptation of Digital Human Responses," U.S. patent application Ser. No. 18/653,056, entitled "Automatically Generating Language Model Prompts Using Predicted Regions of Interest," U.S. patent application Ser. No. 18/652,990, entitled "Pause-Based Text-To-Speech Processing for Digital Humans," U.S. patent application Ser. No. 18/652,926, entitled "Identity-Based Varied Digital Human Responses," U.S. patent application Ser. No. 18/653,028, entitled "Reinstantiating Digital Humans With Stored Session Context in Response to Device Transfer," U.S. patent application Ser. No. 18/653,046, entitled "Reinstantiating Digital Humans With Stored Session Context in Response to Navigation to a Different Destination," and U.S. patent application Ser. No. 18/652,991, entitled "Personalizing Vehicles Using Digital Humans to Administer User Preferences," each filed contemporaneously herewith and incorporated by reference herein in its entirety FIG. 3 illustrates an exemplary processing of sensor data from a user environment to identify an isolated speaker signal and to orient a digital human towards a speaker associated with the isolated speaker signal in accordance with an illustrative embodiment. In the example of FIG. 3, one or more user environment signals 310 (e.g., audio and/or video signals from a user interacting with a digital human) are applied to a sensor data processing system 320. The sensor data processing system 320 comprises a lip motion analyzer 322, a speech analyzer 324 and a microphone array signal processor 326. The lip motion analyzer 322 may employ a lip motion-to-text model to transform one or more video streams to text, as discussed further below in conjunction with FIG. 3. The speech analyzer 324 may employ a speech-to-text model to transform one or more audio streams to text, as discussed further below in conjunction with FIG. 3. The microphone array signal processor 326 adjusts a steering vector associated with a multi-directional microphone array, for example, to isolate individual audio signals from the multi-directional microphone array.

In one or more embodiments, the audio/visual signal processing module 350 processes the outputs from the lip motion analyzer 322, the speech analyzer 324 and/or the microphone array signal processor 326 to identify an isolated speaker signal 360, as discussed further below in conjunction with FIGS. 4 and 5. In addition, the audio/visual signal processing module 350 may provide isolated speaker coordinates 365, associated with the isolated speaker signal 360, to a three-dimensional graphics engine-based digital human orientation module 370 that orients a digital human towards a direction of a speaker, as discussed further below in conjunction with FIGS. 6 and 7.

Figure 4:
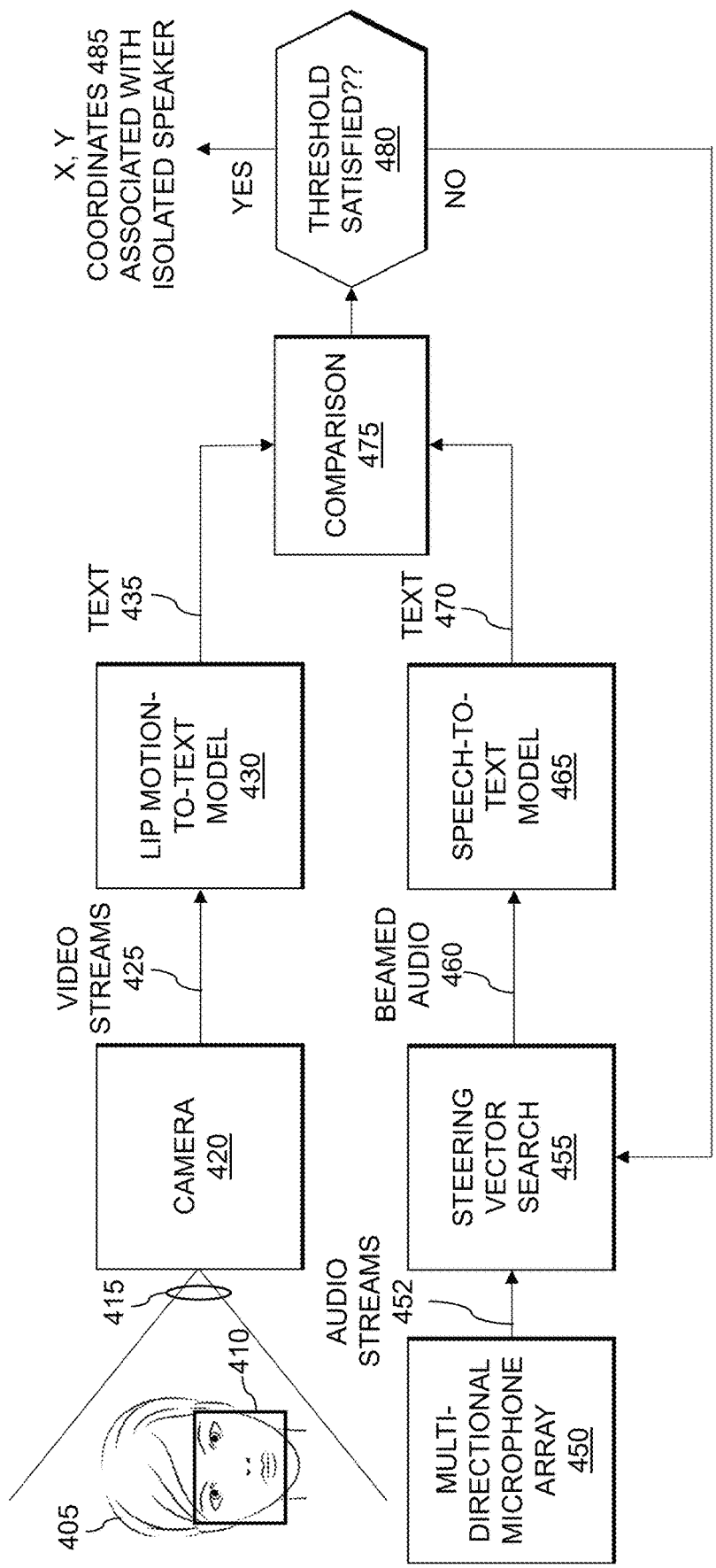
FIG. 4 illustrates an exemplary processing of audio and video streams from a user environment to determine coordinates of a speaker associated with an isolated speaker signal in accordance with an illustrative embodiment.

FIG. 4 illustrates an exemplary processing of audio and video streams from a user environment to determine coordinates of a speaker associated with an isolated speaker signal in accordance with an illustrative embodiment. In the example of FIG. 4, a user 405 is in a field of view 415 of at least one camera 420. A bounding box 410 (or another cropped image) is positioned in the vicinity of the lips of the user 405 in one or more images from the camera 420. In addition, a multi-directional microphone array 450 is placed in a vicinity of the user 405 to capture the speech of the user 405, and possibly additional users in the vicinity.

As shown in FIG. 4, the camera 420 generates one or more video streams 425 comprising images of the user 405. The one or more video streams 425 are applied to a lip motion-to-text model 430 that converts a video stream 425 to text 435. In addition, the multi-directional microphone array 450 generates one or more audio streams 452 comprising speech of the user 405. The one or more audio streams 452 are applied to a steering vector search process 455 that iteratively adjusts a steering vector associated with the multi-directional microphone array 450, as discussed further below in conjunction with FIG. 5. The steering vector search process 455 generates beamed audio 460 that is applied to a speech-to-text model 465 that converts the beamed audio 460 to text 470.

A comparison block 475 compares the text 435 from the video stream 425 to the text 470 from the beamed audio 460. A test 480 is performed to determine if a designated threshold is satisfied. If the designated threshold is not satisfied, then the steering vector search process 455 iteratively adjusts the steering vector associated with the multi-directional microphone array 450 to evaluate another audio signal, and continues in the manner described above.

If the designated threshold is satisfied, then the current X, Y coordinates 485 are associated with the isolated speaker.

FIG. 5 is a flow diagram illustrating an exemplary implementation of a process 500 for identifying an isolated speaker signal in accordance with an illustrative embodiment. In the example of FIG. 5, the process 500 transforms one or more audio signals in step 1 from a multi-directional microphone array (e.g., the multi-directional microphone array 450 of FIG. 4) to first sets of predicted spoken words using at least one speech-to-text conversion model (such as speech-to-text model 465 of FIG. 4). One or more facial images from at least one video stream are transformed in step 2 to second sets of predicted spoken words using at least one lip motion-to-text conversion model (such as lip motion-to-text model 430 of FIG. 4). The second sets of predicted spoken words are based at least in part on an analysis of a respective bounding box (such as bounding box 410 or another cropped image) associated with at least the lips of a respective speaker.

In one or more embodiments, the process 500 iteratively adjusts a steering vector associated with the multi-directional microphone array in step 3 to compare at least one of the first sets of predicted spoken words with at least one of the second set of predicted spoken words. An isolated speaker audio signal associated with a particular one of the first sets of predicted spoken words and a particular one of the second set of predicted spoken words is selected in step 4. The selection is based at least in part on a result of the comparison of step 3.

The isolated speaker audio signal may be validated over time (e.g., periodically, upon occurrence of a designated event or when a designated threshold is satisfied) in step 5 by evaluating one or more predicted next words of the isolated speaker audio signal with a corresponding set of predicted spoken words from the at least one speech-to-text conversion model.

Figure 6:
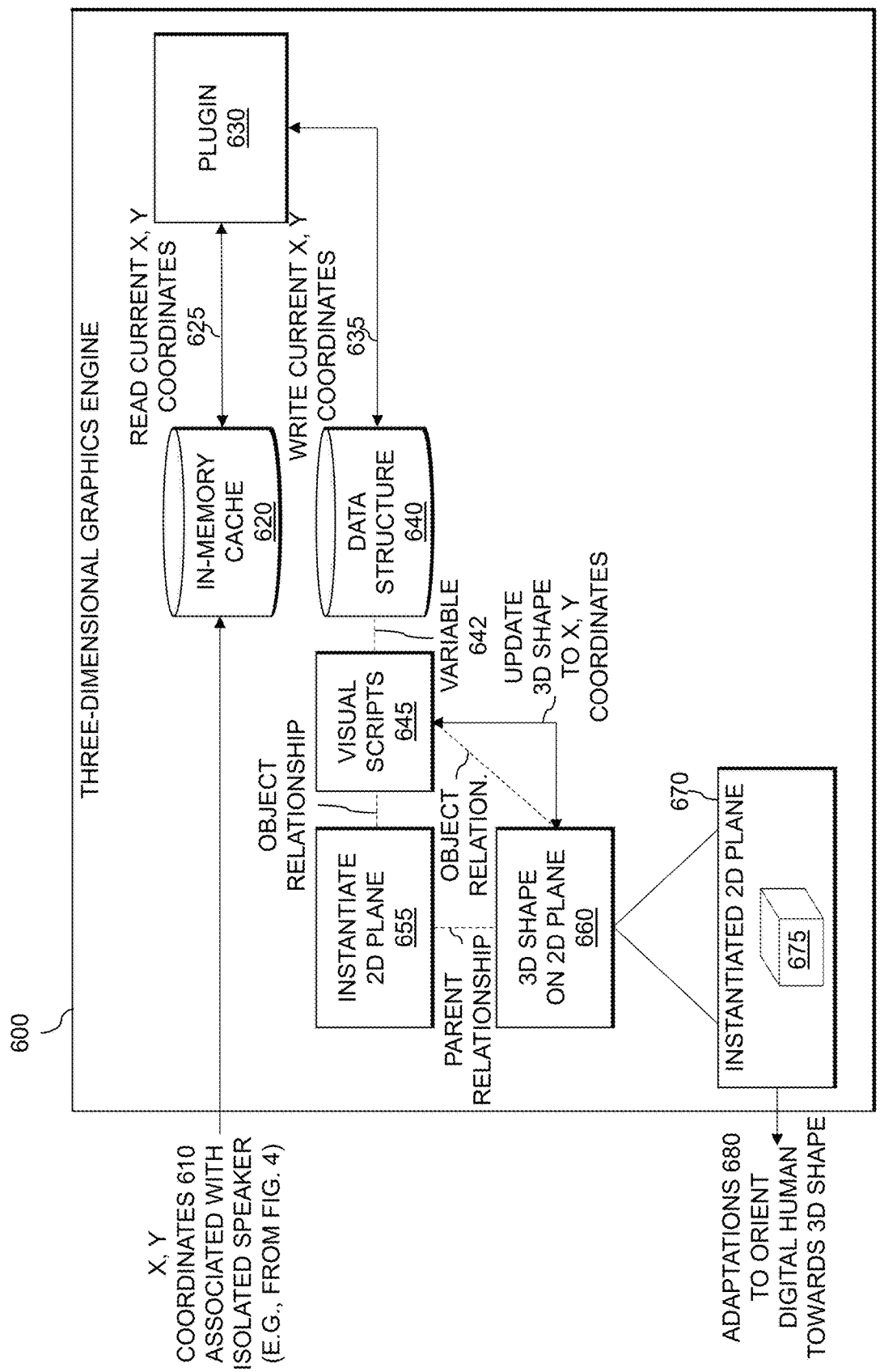
FIG. 6 illustrates an exemplary processing of coordinates of a speaker associated with an isolated speaker signal to orient a digital human towards the speaker associated with the isolated speaker signal in accordance with an illustrative embodiment.

FIG. 6 illustrates an exemplary processing of coordinates of a speaker associated with an isolated speaker signal to orient a digital human towards the speaker associated with the isolated speaker signal in accordance with an illustrative embodiment. In the example of FIG. 6, the current X, Y coordinates 610 associated with an isolated speaker (e.g., center coordinates of a bounding box 410 of FIG. 4 or another cropped image associated with the isolated speaker), obtained, for example, from the processing of FIG. 4, are stored in an in-memory cache 620 of a three-dimensional graphics engine 600, such as the Unreal Engine three-dimensional computer graphics tool. A plugin 630 of the three-dimensional graphics engine 600 reads the current X, Y coordinates 625 from the in-memory cache 620, and writes the current X, Y coordinates 635 to a data structure 640 of the three-dimensional graphics engine 600.

As shown in FIG. 6, one or more visual scripts 645, such as one or more visual scripts generated using the blueprint visual scripting system in the Unreal Engine to define object-oriented classes or objects. The one or more visual scripts 645 obtain a variable 642 comprising the current coordinates from the data structure 640 and instantiates a two-dimensional (2D) plane 655 with an object relationship. A three-dimensional (3D) shape 660 is instantiated on the two-dimensional (2D) plane 655, and the 3D shape 660 has a parent relationship with the 2D plane 655. The 3D shape 660 has an object relationship with the one or more visual scripts 645. As the one or more visual scripts 645 update the variable 642 the 3D shape 660 is updated to the current X, Y coordinates by the Unreal Engine.

A representation 670 of the instantiated 2D plane 655 comprises a representation 675 of the current position and orientation of the 3D shape 660. As the current position and orientation of the 3D shape 660 is updated, one or more adaptations 680 are generated that automatically orient a digital human towards the current position and orientation of the representation of the three-dimensional shape 675.

FIG. 7 is a flow diagram illustrating an exemplary implementation of a process 700 for orienting a digital human towards a speaker associated with an isolated speaker signal in accordance with an illustrative embodiment. In the example of FIG. 7, the process 700 initially obtains coordinates of the bounding box (e.g., bounding box 410 of FIG. 4 or another cropped image) associated with the isolated speaker audio signal in step 1. The coordinates of the bounding box may be obtained, for example, from the processing of FIG. 4. The bounding box coordinates are stored in step 2 as a variable in a memory of a three-dimensional graphics engine (e.g., the Unreal Engine).

In one or more embodiments, a two-dimensional plane is instantiated in step 3 within the three-dimensional graphics engine. A three-dimensional shape is positioned in step 4 in the instantiated two-dimensional plane based at least in part on the stored bounding box coordinates (e.g., stored as a variable). The digital human is bound in step 5 to the three-dimensional shape to orient the digital human towards position of three-dimensional shape and to direct eye focus of digital human to a position of the three-dimensional shape.

As shown in FIG. 7, the body (e.g., a torso) and/or hands of the digital human are adjusted in step 6, towards a position of the body and/or hands of a speaker associated with the bounding box, based on a position of the three-dimensional shape. Thereafter, steps 1 through 6 may be repeated for one or more additional iterations.

Figure 8:
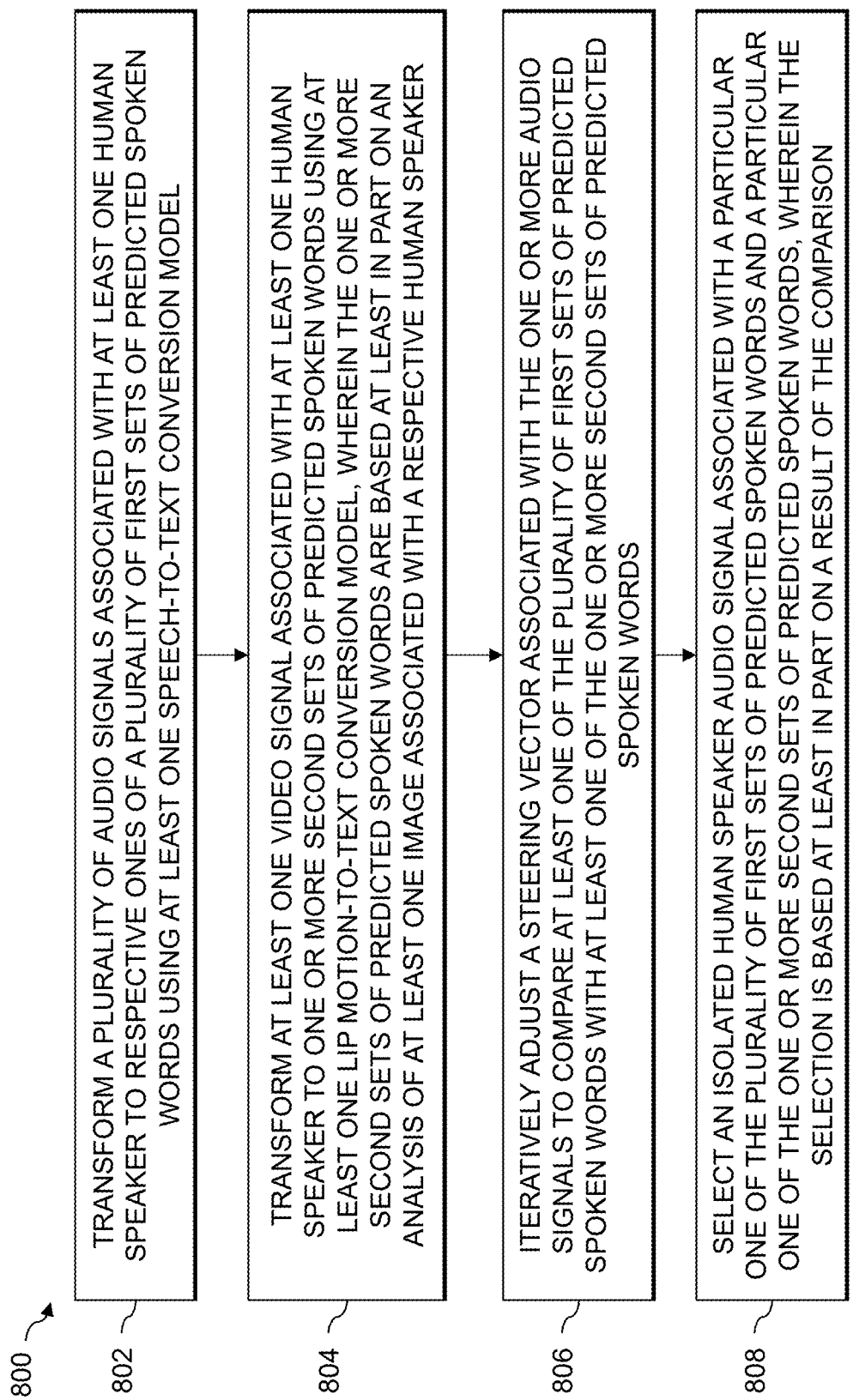
FIG. 8 is a flow diagram illustrating an exemplary implementation of a process for orienting a digital human towards an isolated human speaker in accordance with an illustrative embodiment.

FIG. 8 is a flow diagram illustrating an exemplary implementation of a process 800 for orienting a digital human towards an isolated human speaker in accordance with an illustrative embodiment. In the example of FIG. 8, a plurality of audio signals associated with at least one human speaker are transformed in step 802 to respective ones of a plurality of first sets of predicted spoken words using at least one processor-based speech-to-text conversion model. At least one video signal associated with the at least one human speaker is transformed in step 804 to one or more second sets of predicted spoken words using at least one processor-based lip motion-to-text conversion model, wherein the one or more second sets of predicted spoken words are based at least in part on an analysis of a cropped image associated with a respective human speaker.

A steering vector associated with the plurality of audio signals is iteratively adjusted in step 806 to compare at least one of the plurality of first sets of predicted spoken words with at least one of the one or more second sets of predicted spoken words. An isolated human speaker audio signal is associated with a particular one of the plurality of first sets of predicted spoken words and a particular one of the one or more second sets of predicted spoken words is selected in step 808, wherein the selection is based at least in part on a result of the comparison.

In at least one embodiment, the plurality of audio signals is obtained from a multi-directional microphone array. The isolated human speaker audio signal may be validated over time by evaluating one or more predicted next words of the isolated human speaker audio signal with a corresponding set of predicted spoken words from the at least one speech-to-text conversion model.

In some embodiments, the respective cropped image associated with a respective human speaker may comprise at least one coordinate in a multi-dimensional plane.

In one or more embodiments, the iteratively adjusting the steering vector associated with the plurality of audio signals employs beamforming techniques. The iteratively adjusting the steering vector associated with the plurality of audio signals may adjust a position of the steering vector until the comparison satisfies a designated threshold. The human speaker associated with the isolated human speaker audio signal may be interacting with at least one processor-based digital human.

Figure 9:
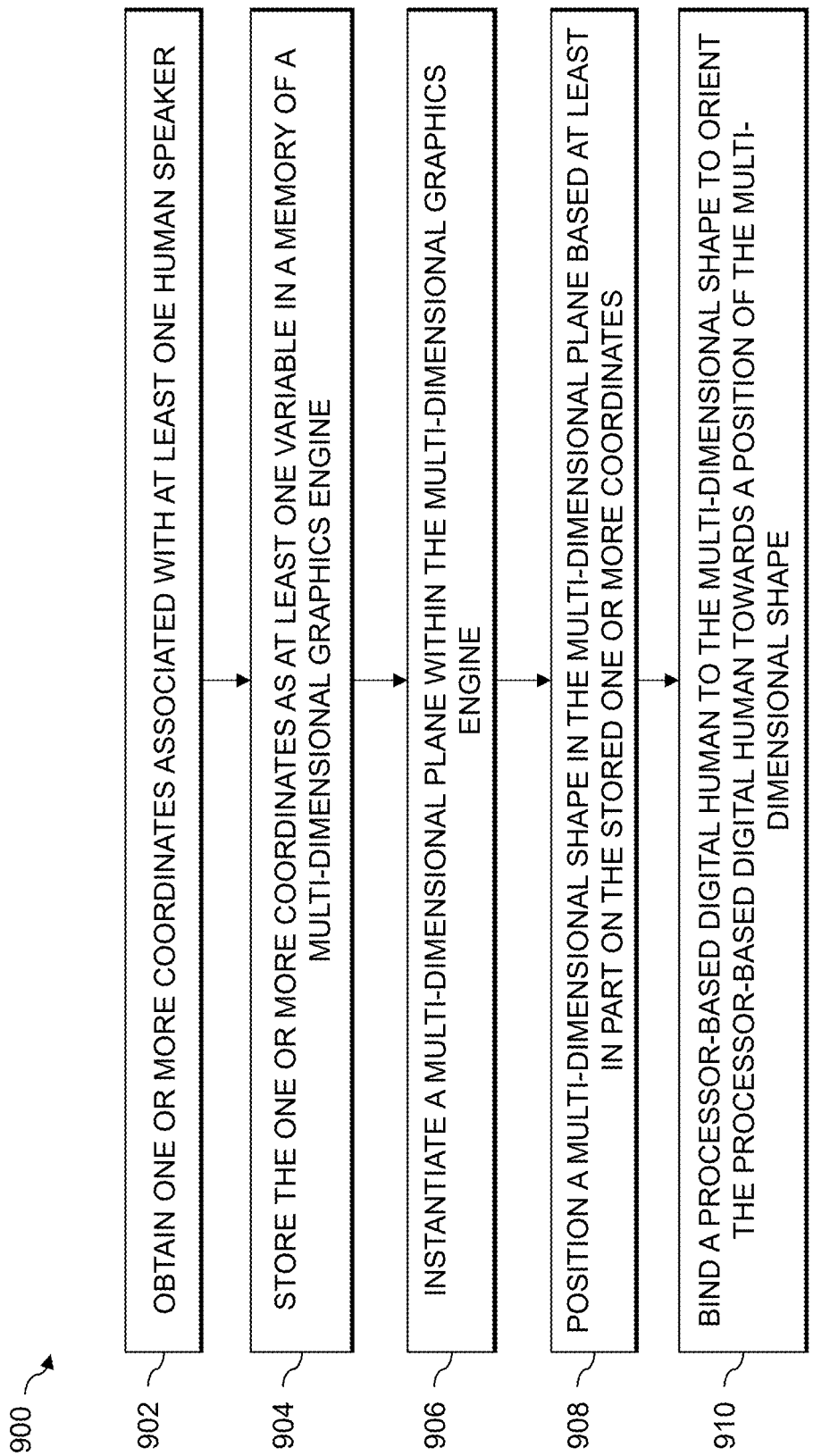
FIG. 9 is a flow diagram illustrating an exemplary implementation of a process for orienting a digital human towards an isolated speaker in accordance with an illustrative embodiment.

FIG. 9 is a flow diagram illustrating an exemplary implementation of a process 900 for orienting a digital human towards an isolated human speaker in accordance with an illustrative embodiment. In the example of FIG. 9, one or more coordinates associated with at least one human human speaker (e.g., coordinates of a bounding box or another cropped image) are obtained in step 902. The one or more coordinates are stored as at least one variable in step 904 in a memory of a multi-dimensional graphics engine. A multi-dimensional plane is instantiated within the multi-dimensional graphics engine in step 906.

A multi-dimensional shape is positioned in step 908 in the multi-dimensional plane based at least in part on the stored one or more coordinates. A processor-based digital human is bound to the multi-dimensional shape in step 910 to orient the processor-based digital human towards a position of the multi-dimensional shape.

In at least one embodiment, the one or more coordinates associated with the at least one human speaker may be obtained by processing one or more audio signals obtained from a multi-directional microphone array. The one or more coordinates associated with the at least one human speaker may be obtained by comparing text obtained from one or more video streams to text obtained from the one or more audio signals. An eye orientation of the processor-based digital human may be directed towards a current position of the multi-dimensional shape. The bounding box or another cropped image may be associated with a given human speaker interacting with the processor-based digital human.

In some embodiments, a position of one or more of a body and at least one hand of the processor-based digital human may be adjusted based at least in part on a corresponding position of one or more of a body and at least one hand of at least one human speaker based at least in part on the stored one or more coordinates. The at least one human speaker may be associated with at least one audio signal isolated from one or more audio signals.

The particular processing operations and other network functionality described in conjunction with FIGS. 4 through 9, for example, are presented by way of illustrative example only, and should not be construed as limiting the scope of the disclosure in any way. Alternative embodiments can use other types of processing operations for orienting a digital human towards an isolated speaker. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

One or more embodiments of the disclosure provide improved methods, apparatus and computer program products for orienting a digital human towards an isolated speaker. The foregoing applications and associated embodiments should be considered as illustrative only, and numerous other embodiments can be configured using the techniques disclosed herein, in a wide variety of different applications.

It should also be understood that the disclosed techniques for orienting a digital human towards an isolated speaker, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for orienting a digital human towards an isolated human speaker may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute and/or storage services can be offered to cloud infrastructure tenants or other system users as a PaaS, IaaS, STaaS and/or FaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based digital human adaptation engine, or portions thereof, are illustratively implemented for use by tenants of such a multi-tenant environment.

Cloud infrastructure as disclosed herein can include cloud-based systems. Virtual machines provided in such systems can be used to implement at least portions of a cloud-based digital human adaptation platform in illustrative embodiments. The cloud-based systems can include object stores.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 10 and 11. These platforms may also be used to implement at least portions of other information processing systems in other embodiments.

Figure 10:
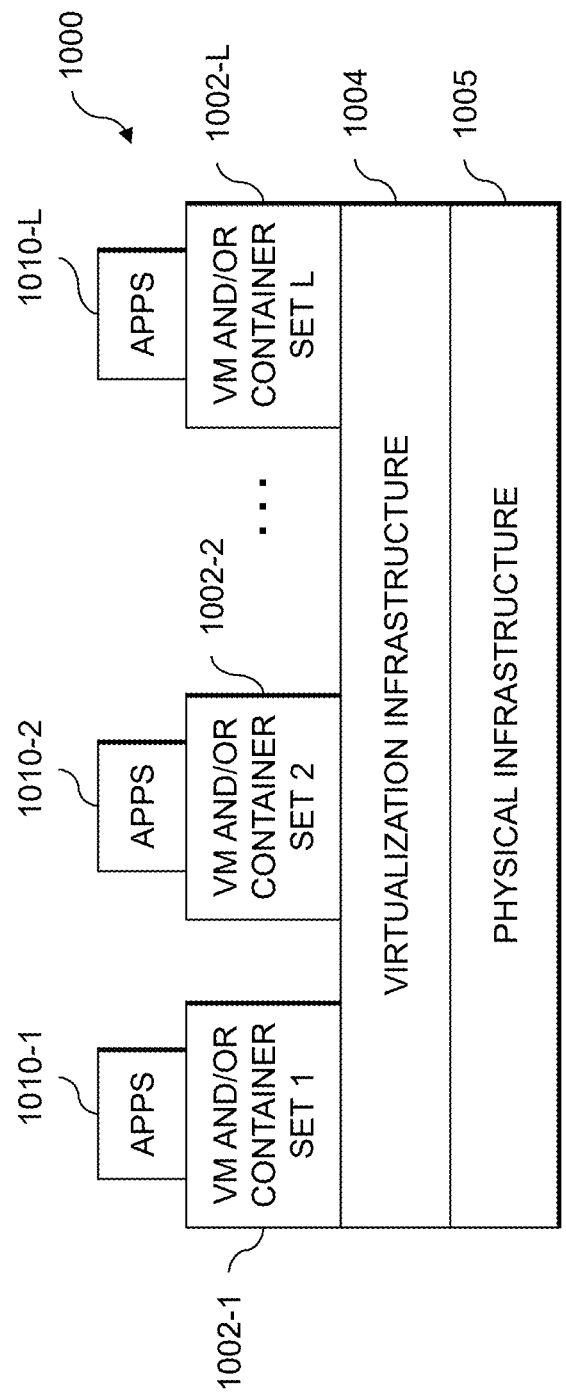
FIG. 10 illustrates an exemplary processing platform that may be used to implement at least a portion of one or more embodiments of the disclosure comprising a cloud infrastructure.

FIG. 10 shows an example processing platform comprising cloud infrastructure 1000. The cloud infrastructure 1000 comprises a combination of physical and virtual processing resources that may be utilized to implement at least a portion of the information processing system 100. The cloud infrastructure 1000 comprises multiple virtual machines (VMs) and/or container sets 1002-1, 1002-2, . . . 1002-L implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2, . . . 1010-L running on respective ones of the VMs/container sets 1002-1, 1002-2, . . . 1002-L under the control of the virtualization infrastructure 1004. The VMs/container sets 1002 may comprise respective VMs, respective sets of one or more containers, or respective sets of one or more containers running in VMs.

In some implementations of the FIG. 10 embodiment, the VMs/container sets 1002 comprise respective VMs implemented using virtualization infrastructure 1004 that comprises at least one hypervisor. Such implementations can provide digital human adaptation functionality of the type described above for one or more processes running on a given one of the VMs. For example, each of the VMs can implement digital human adaptation control logic and associated functionality for monitoring users interacting with a digital human, for one or more processes running on that particular VM.

An example of a hypervisor platform that may be used to implement a hypervisor within the virtualization infrastructure 1004 is a compute virtualization platform which may have an associated virtual infrastructure management system such as server management software. The underlying physical machines may comprise one or more distributed processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system. Such implementations can provide digital human adaptation functionality of the type described above for one or more processes running on different ones of the containers. For example, a container host device supporting multiple containers of one or more container sets can implement one or more instances of digital human adaptation control logic and associated functionality for monitoring users interacting with a digital human.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises at least a portion of the given system and includes a plurality of processing devices, denoted 1102-1, 1102-2, 1102-3, . . . 1102-K, which communicate with one another over a network 1104. The network 1104 may comprise any type of network, such as a WAN, a LAN, a satellite network, a telephone or cable network, a cellular network, a wireless network such as WiFi or WiMAX, or various portions or combinations of these and other types of networks.

The processing device 1102-1 in the processing platform 1100 comprises a processor 1110 coupled to a memory 1112. The processor 1110 may comprise a microprocessor, a microcontroller, an ASIC, an FPGA or other type of processing circuitry, as well as portions or combinations of such circuitry elements, and the memory 1112, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and the given system may include additional or alternative processing platforms, as well as numerous distinct processing platforms in any combination, with each such platform comprising one or more computers, storage devices or other processing devices.

Figure 11:
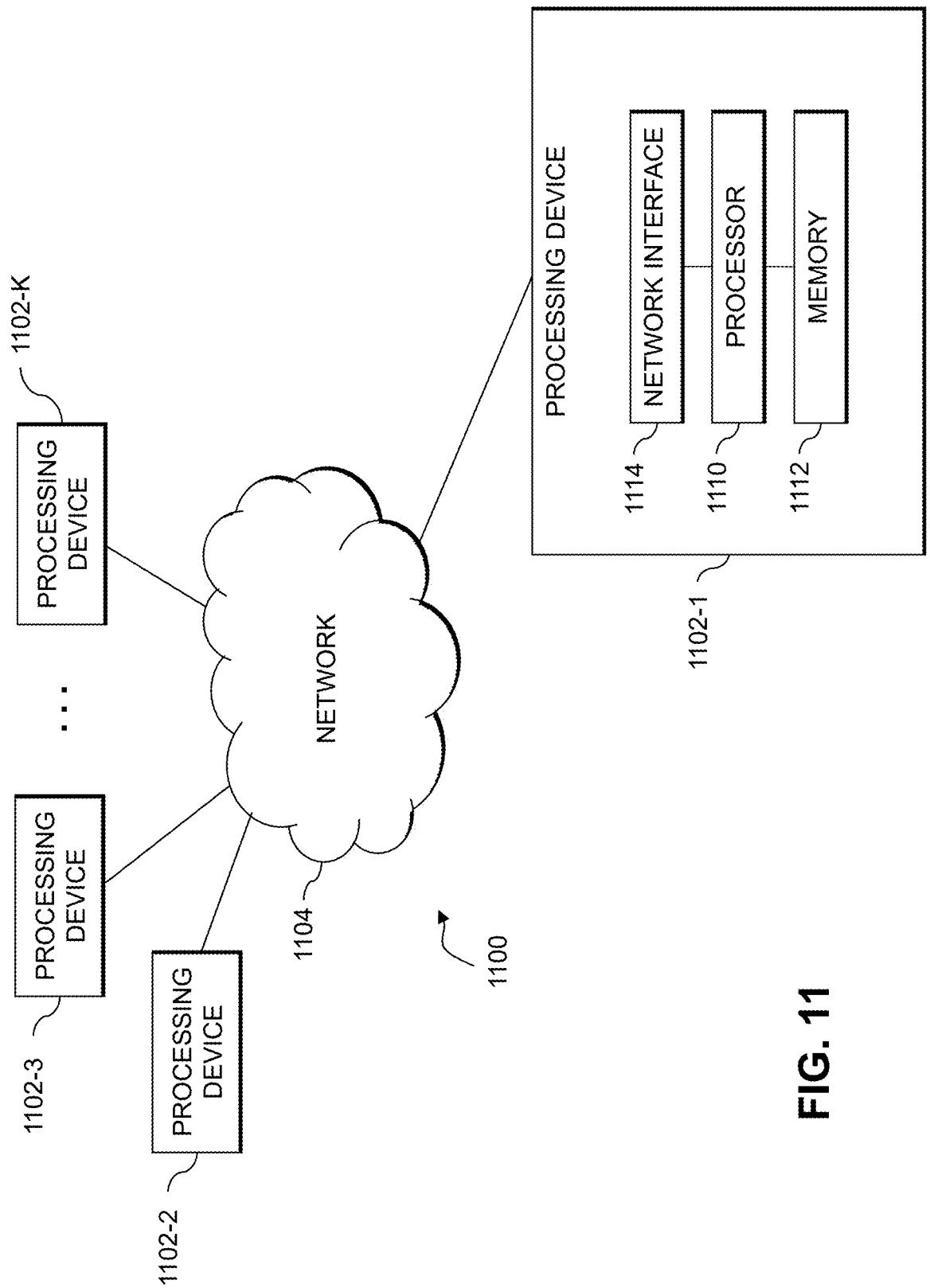
FIG. 11 illustrates another exemplary processing platform that may be used to implement at least a portion of one or more embodiments of the disclosure.

Multiple elements of an information processing system may be collectively implemented on a common processing platform of the type shown in FIG. 10 or 11, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
   obtaining one or more coordinates associated with at least one human speaker;
   storing the one or more coordinates as at least one variable in a memory of a multi-dimensional graphics engine;
   instantiating a multi-dimensional plane within the multi-dimensional graphics engine;
   positioning a multi-dimensional shape in the multi-dimensional plane based at least in part on the stored one or more coordinates; and binding a processor-based digital human to the multi-dimensional shape to orient the processor-based digital human towards a position of the multi-dimensional shape;

wherein the method is performed by at least one processing device comprising a processor coupled to a memory.

2. The method of claim 1, wherein the one or more coordinates associated with the at least one human speaker are obtained by processing one or more audio signals obtained from a multi-directional microphone array.

3. The method of claim 2, wherein the one or more coordinates associated with the at least one human speaker are obtained by comparing text obtained from one or more video streams to text obtained from the one or more audio signals.

4. The method of claim 1, further comprising directing an eye orientation of the processor-based digital human towards a current position of the multi-dimensional shape.

5. The method of claim 1, wherein a cropped image is associated with a given human speaker interacting with the processor-based digital human.

6. The method of claim 1, further comprising adjusting a position of one or more of a body and at least one hand of the processor-based digital human based at least in part on a corresponding position of one or more of a body and at least one hand of at least one human speaker based at least in part on the stored one or more coordinates.

7. The method of claim 1, wherein the at least one human speaker is associated with at least one audio signal isolated from one or more audio signals.

8. An apparatus comprising:
at least one processing device comprising a processor coupled to a memory;
the at least one processing device being configured to implement the following steps:
obtaining one or more coordinates associated with at least one human speaker;
storing the one or more coordinates as at least one variable in a memory of a multi-dimensional graphics engine;
instantiating a multi-dimensional plane within the multi-dimensional graphics engine;
positioning a multi-dimensional shape in the multi-dimensional plane based at least in part on the stored one or more coordinates; and
binding a processor-based digital human to the multi-dimensional shape to orient the processor-based digital human towards a position of the multi-dimensional shape.

9. The apparatus of claim 8, wherein the one or more coordinates associated with the at least one human speaker are obtained by processing one or more audio signals obtained from a multi-directional microphone array.

10. The apparatus of claim 9, wherein the one or more coordinates associated with the at least one human speaker are obtained by comparing text obtained from one or more video streams to text obtained from the one or more audio signals.

11. The apparatus of claim 8, further comprising directing an eye orientation of the processor-based digital human towards a current position of the multi-dimensional shape.

12. The apparatus of claim 8, wherein a cropped image is associated with a given human speaker interacting with the processor-based digital human.

13. The apparatus of claim 8, further comprising adjusting a position of one or more of a body and at least one hand of the processor-based digital human based at least in part on a corresponding position of one or more of a body and at least one hand of at least one human speaker based at least in part on the stored one or more coordinates.

14. The apparatus of claim 8, wherein the at least one human speaker is associated with at least one audio signal isolated from one or more audio signals.

15. A non-transitory processor-readable storage medium having stored therein program code of one or more software programs, wherein the program code when executed by at least one processing device causes the at least one processing device to perform the following steps:
obtaining one or more coordinates associated with at least one human speaker;
storing the one or more coordinates as at least one variable in a memory of a multi-dimensional graphics engine;
instantiating a multi-dimensional plane within the multi-dimensional graphics engine;
positioning a multi-dimensional shape in the multi-dimensional plane based at least in part on the stored one or more coordinates; and
binding a processor-based digital human to the multi-dimensional shape to orient the processor-based digital human towards a position of the multi-dimensional shape.

16. The non-transitory processor-readable storage medium of claim 15, wherein the one or more coordinates associated with the at least one human speaker are obtained by processing one or more audio signals obtained from a multi-directional microphone array.

17. The non-transitory processor-readable storage medium of claim 16, wherein the one or more coordinates associated with the at least one human speaker are obtained by comparing text obtained from one or more video streams to text obtained from the one or more audio signals.

18. The non-transitory processor-readable storage medium of claim 15, further comprising directing an eye orientation of the processor-based digital human towards a current position of the multi-dimensional shape.

19. The non-transitory processor-readable storage medium of claim 15, wherein a cropped image is associated with a given human speaker interacting with the processor-based digital human.

20. The non-transitory processor-readable storage medium of claim 15, further comprising adjusting a position of one or more of a body and at least one hand of the processor-based digital human based at least in part on a corresponding position of one or more of a body and at least one hand of at least one human speaker based at least in part on the stored one or more coordinates.

* * * * *